(12) United States Patent
Hollatz et al.

(10) Patent No.: US 7,349,529 B2
(45) Date of Patent: Mar. 25, 2008

(54) CONTACT CENTER CONFERENCING OF E-MAIL MESSAGE

(75) Inventors: Mike Hollatz, Huntley, IL (US); David Wesen, Channahon, IL (US); Jeff Hodson, Wheaton, IL (US); Roger Sumner, Batavia, IL (US)

(73) Assignee: Rockwell Electronic Commerce Technologies, LLC, Wood Dale, IL (US)

( * ) Notice: Subject to any disclaimer, the term of this patent is extended or adjusted under 35 U.S.C. 154(b) by 0 days.

(21) Appl. No.: 11/111,251

(22) Filed: Apr. 21, 2005

(65) Prior Publication Data

US 2006/0239420 A1   Oct. 26, 2006

(51) Int. Cl.
*H04M 11/06* (2006.01)
(52) U.S. Cl. .............................. 379/88.13; 379/265.01; 709/206
(58) Field of Classification Search ........... 379/202.01, 379/88.13, 211.02, 265.09; 709/224, 206
See application file for complete search history.

(56) References Cited

U.S. PATENT DOCUMENTS

| | | | |
|---|---|---|---|
| 5,555,179 A | 9/1996 | Koyama et al. | |
| 5,765,033 A | 6/1998 | Miloslavsky | |
| 5,926,539 A | 7/1999 | Shtivelman | |
| 5,946,387 A | 8/1999 | Miloslavsky | |
| 5,953,332 A | 9/1999 | Miloslavsky | |
| 5,953,405 A | 9/1999 | Miloslavsky | |
| 6,002,760 A | 12/1999 | Gisby | |
| 6,021,428 A | 2/2000 | Miloslavsky | |
| 6,044,145 A | 3/2000 | Kelly et al. | |
| 6,044,368 A | 3/2000 | Powers | |
| 6,067,357 A | 5/2000 | Kishinsky et al. | |
| 6,108,711 A | 8/2000 | Beck et al. | |
| 6,138,139 A | 10/2000 | Beck et al. | |
| 6,167,395 A | 12/2000 | Beck et al. | |
| 6,170,011 B1 | 1/2001 | Beck et al. | |
| 6,175,563 B1 | 1/2001 | Miloslavsky | |
| 6,175,564 B1 | 1/2001 | Miloslavsky et al. | |
| 6,185,292 B1 | 2/2001 | Miloslavsky | |
| 6,345,305 B1 | 2/2002 | Beck et al. | |
| 6,373,836 B1 | 4/2002 | Deryugin et al. | |
| 6,389,007 B1 | 5/2002 | Shenkman et al. | |
| 6,393,015 B1 | 5/2002 | Shtivelman | |
| 6,601,099 B1* | 7/2003 | Corneliussen ................ | 709/224 |
| 6,732,156 B2 | 5/2004 | Miloslavsky | |
| 6,745,024 B1* | 6/2004 | DeJaco et al. ............... | 709/206 |
| 7,013,003 B2* | 3/2006 | Seligmann ............. | 379/211.02 |
| 2004/0013254 A1* | 1/2004 | Hamberg et al. ....... | 379/202.01 |
| 2006/0093126 A1* | 5/2006 | Wesen ................... | 379/265.09 |

FOREIGN PATENT DOCUMENTS

| | | |
|---|---|---|
| JP | 2003167826 A | 12/2001 |
| JP | 2002016632 A | 1/2002 |

* cited by examiner

*Primary Examiner*—Gerald Gauthier
(74) *Attorney, Agent, or Firm*—Welsh & Katz, Ltd.

(57) ABSTRACT

The method or system for conferencing an email message such that two or more individuals can simultaneously answer an email message and input their individual expertise on a solution or answer to the email message comprising the steps of or software and circuitry for: receiving and processing an email message at an email server, supplying the email message to a custom SIP user agent to initiate an email session which simultaneously delivers the email message to client agents each containing a custom SIP user agent for processing/answering the email.

17 Claims, 1 Drawing Sheet

CONTACT CENTER CONFERENCING OF E-MAIL MESSAGE

BACKGROUND

1. Field of the Invention

Figure 1:
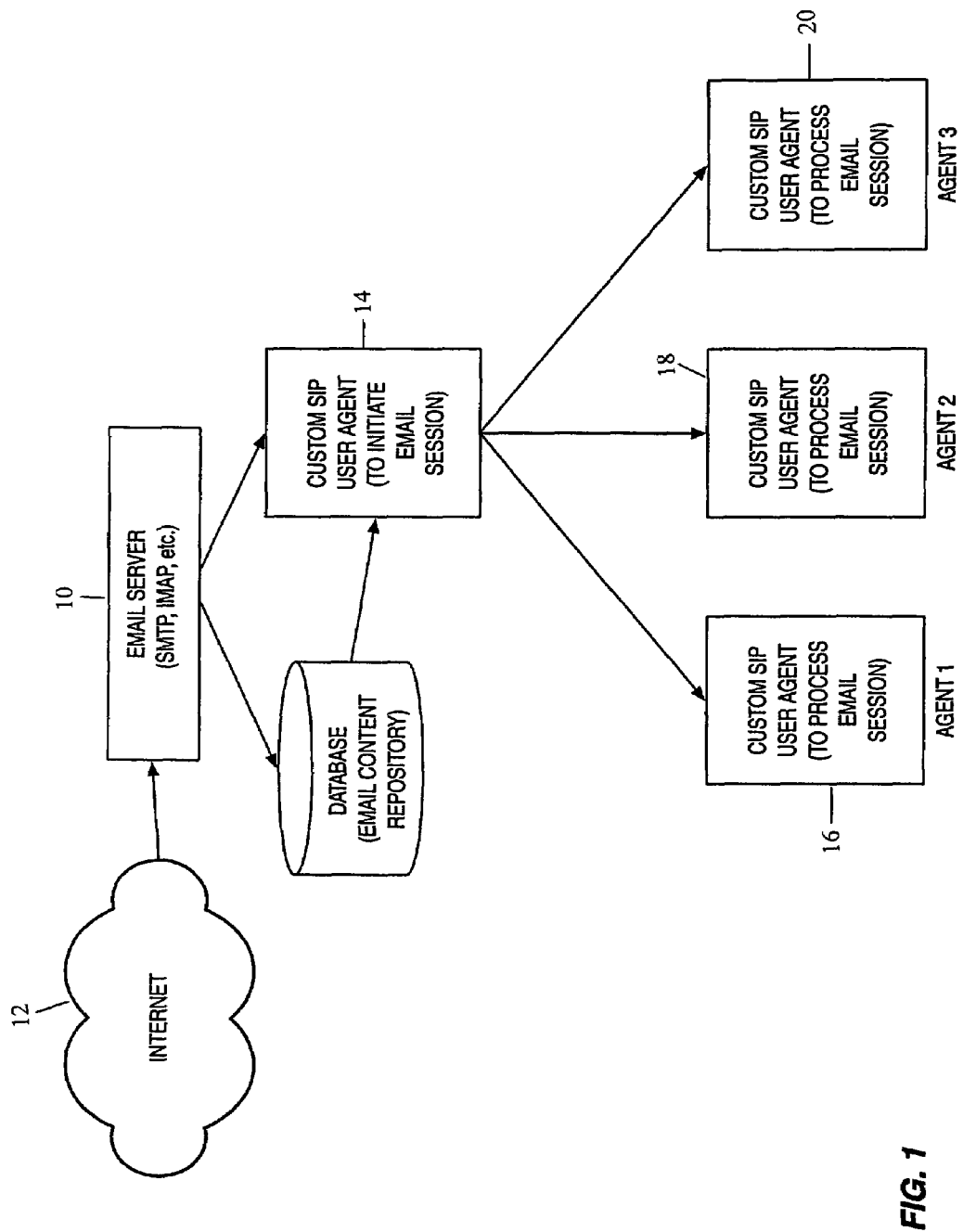

The present invention relates to simultaneously processing or parallel answering of an email message.

2. Description of the Related Art

Email, as a messaging technology, presently does not have a mechanism that allows or enables more than one person at a time to answer or work on an email message. Presently email messaging systems allow or enable one person at a time to answer or work on an email message. This forces a message that needs input from individuals who have different expertise to be forwarded to a first individual and then sequentially to a second individual, third individual, etc. until the input of all the individuals with different expertise is obtained.

Heretofore a call center system has been proposed wherein, when a call comes in, a requested type of service is determined and also what skills are required to answer the call are determined. The call is routed to an agent that has the highest efficiency level for the skills required for answering the call based on the requested type of service.

BRIEF SUMMARY OF THE INVENTION

According to one embodiment of the present invention there is provided a method for conferencing an email message such that two or more individuals can simultaneously answer an email message and input their individual expertise on a solution or answer to the email message comprising the steps of: receiving and processing an email message at an email server, supplying the email message to a custom SIP user agent to initiate an email session which simultaneously delivers the email message to client agents each containing a custom SIP user agent for processing/answering the email.

Further, according to another embodiment of the present invention there is provided a system for conferencing an email message such that two or more individuals can simultaneously answer an email message and input their individual expertise on a solution or answer to the email message comprising software and circuitry for receiving and processing an email message at an email server, software and circuitry for supplying the email message to a custom SIP user agent to initiate an email session which simultaneously delivers the email message to client agents each containing a custom SIP user agent for processing/answering the email.

BRIEF DESCRIPTION OF THE FIGURE OF THE DRAWINGS

The invention, together with the advantages thereof, may be understood by reference to the following description in conjunction with the accompanying FIGURE, which illustrate an embodiment of the invention.

FIG. 1 of the drawing is a block diagram of the establishment of a conference type handling of an email by three agents.

DETAILED DESCRIPTION

While the present invention is susceptible of embodiments in various forms, there is shown in the drawing and will hereinafter be described some exemplary and non-limiting embodiments, with the understanding that the present disclosure is to be considered an exemplification of the invention and is not intended to limit the invention to the specific embodiments illustrated. In this disclosure, the use of the disjunctive is intended to include the conjunctive. The use of the definite article or indefinite article is not intended to indicate cardinality. In particular, a reference to "the" object or "a" object is intended to denote also one of a possible plurality of such objects.

Using SIP (Session Initiation Protocol) 10 which receives email messages from the Internet 12, a session 14 can be created that has no RTP (Real-Time Transport Protocol) portion. This session can be put in place to allow multiple agents 16, 18 and 20 to join a "conference" with this session and handle the email message as illustrated in the FIGURE of the drawing.

The session 14 can be set up to direct an email message from a known source to several agents 16, 18 and 20 that may be able to provide input on the answer to questions from the known source.

Alternatively, once an email is received by the Custom SIP User Agent to initiate an email session 14, he or she, can alert other agents who may be able to input on the questions asked in the email to join in the conference answering of the email.

The session 14 can be measured when an agent is working on the e-mail and not measured when the agent is not working on the e-mail regardless of who joins the conference or when they join.

This mechanism is not dependent on SIP and there are other protocols that can accomplish this task. Each of the agents 16, 18 and 20, etc., will receive proper "credit" (from a reporting perspective) for the effort they contributed to answer the email message.

There is also additional benefit since many times the output or synergy of more than one person or a group can be better than the sum of input from the individuals. The conferencing of an email message according to one of the teachings of the present invention enables one to obtain the synergy of a group in processing and answering an email message.

As shown in the FIGURE, email from the Internet 12 is supplied to an email server 10 which uses SMTP (simple mail transfer protocol), IMAP (internet message access protocol) or some similar protocol. The email is then sent to an email content repository and to a custom SIP (Session Initiation Protocol) user agent for initiating an email session 14. From there the email is sent to a client agent (1, 2, 3, etc.) 16, 18 and 20, etc., which employs a customer SIP user agent to process the email.

Specific embodiments of novel methods for email conferencing have been described for exemplification of the invention and are not intended to limit the invention to the specific embodiments illustrated. Numerous modifications and variations can be effectuated without deporting from the scope of the novel concepts of the invention. It is to be understood that no limitation with respect to the specific embodiment illustrated is intended or should be inferred. Accordingly, it is contemplated to cover by the applied claims any and all embodiments, modification, variations or equivalents.

We claim:

1. A method for conferencing an email message such that two or more individuals can simultaneously answer an email message and input their individual expertise on a solution or answer to the email message comprising steps of: receiving and processing an email message at an email server, supplying the email message to a custom SIP user agent to initiate an email session which has no RTP portion, and which simultaneously delivers the email message to a plurality of client agents, each containing a custom SIP user agent for conferencing simultaneously the plurality of client agents for at least one of simultaneous processing and answering the email by the plurality of client agents.

2. The method of claim 1 further comprising a step of measuring a time each agent spends answering the email message regardless of when the agent joins the conference.

3. The method of claim 1 wherein the email message is directed from a known source to a plurality of selected agents.

4. The method of claim 1 wherein the email message is received by the custom SIP user agent and the user agent alerts other selected agents to join in answering the email message.

5. The method of claim 1 wherein the agents receive credit for their respective contributions to the email conference.

6. The method of claim 1 wherein the email message is received from the internet at the email server and the email is sent to an email content repository.

7. The method of claim 1 wherein the email server uses at least one of SMTP and IMAP protocols.

8. A system for conferencing an email message such that two or more individuals can simultaneously answer an email message and input their individual expertise on a solution or answer to the email message comprising: software and circuitry for receiving and processing an email message at an email server; and software and circuitry for supplying the email message to a custom SIP user agent to initiate an email session which has no RTP portion, and which simultaneously delivers the email message to a plurality of client agents, each containing a custom SIP user agent for conferencing simultaneously the plurality of client agents for at least one of simultaneous processing and answering the email by the plurality of client agents.

9. The system of claim 8 wherein the email message is directed from a known source to a plurality of selected agents.

10. The system of claim 8 wherein the email message is received by the custom SIP user agent and the user agent alerts other selected agents to join in answering the email message.

11. The system of claim 8 wherein the agents receive credit for their respective contributions to the email conference.

12. A system for conferencing an email message such that two or more individuals can simultaneously answer an email message and input their individual expertise on a solution or answer to the email message comprising: software and circuitry which receives and processes an email message at an email server; and software and circuitry which supplies the email message to a custom SIP user agent to initiate an email session which has no RTP portion, and which simultaneously delivers the email message to a plurality of client agents, each containing a custom SIP user agent for conferencing simultaneously the plurality of client agents for at least one of simultaneous processing and answering the email by the plurality of client agents, and including software and circuitry for measuring a time each agent spends answering the email message regardless of when the agent joins the conference.

13. The system of claim 12 wherein the agents receive credit for their respective contributions to the email conference.

14. The system of claim 13 wherein the email message is received from the internet at the email server and the email is sent to an email content repository.

15. The system of claim 14 wherein the email server uses at least one of SMTP and IMAP protocols.

16. The system of claim 12 wherein the email message is directed from a known source to a plurality of selected agents.

17. The system of claim 12 wherein the email message is received by the custom SIP user agent, and the user agent alerts selected agents to join in answering the email message.

* * * * *